United States Patent
Chandran et al.

(10) Patent No.: US 7,790,221 B2
(45) Date of Patent: Sep. 7, 2010

(54) SOL-GEL FABRICATION OF THIN-FILM ELECTROLYTE IN AN OXYGEN GENERATOR

(75) Inventors: Ravi R. Chandran, Edison, NJ (US); Lisa Klein, Highland Park, NJ (US); Sandra Mege, Paris (FR)

(73) Assignees: Rutgers, The State University of New Jersey, New Brunswick, NJ (US); Chemionic Technologies, New Brunswick, NJ (US)

( * ) Notice: Subject to any disclaimer, the term of this patent is extended or adjusted under 35 U.S.C. 154(b) by 0 days.

(21) Appl. No.: 11/144,087

(22) Filed: Jun. 3, 2005

(65) Prior Publication Data

US 2005/0258031 A1 Nov. 24, 2005

Related U.S. Application Data

(60) Division of application No. 10/345,876, filed on Jan. 16, 2003, now abandoned, which is a continuation of application No. 09/766,310, filed on Jan. 19, 2001, now abandoned.

(60) Provisional application No. 60/205,458, filed on May 19, 2000.

(51) Int. Cl.
*B05D 5/12* (2006.01)
(52) U.S. Cl. .................... 427/115; 427/126.3
(58) Field of Classification Search .......... 427/58, 427/126.3, 429, 115; 205/628–638
See application file for complete search history.

(56) References Cited

U.S. PATENT DOCUMENTS

| | | | | |
|---|---|---|---|---|
| 4,668,374 A | * | 5/1987 | Bhagat et al. | 204/412 |
| 4,885,142 A | * | 12/1989 | Suitor et al. | 205/634 |
| 4,946,710 A | * | 8/1990 | Miller et al. | 427/126.3 |
| 4,957,673 A | * | 9/1990 | Schroeder et al. | 264/643 |
| 5,057,362 A | * | 10/1991 | Schroeder et al. | 428/312.2 |
| 5,176,967 A | * | 1/1993 | Ishihara et al. | 429/31 |
| 5,391,393 A | * | 2/1995 | Maniar | 438/3 |
| 5,441,610 A | * | 8/1995 | Renlund et al. | 205/634 |
| 5,449,479 A | * | 9/1995 | Clark et al. | 264/618 |
| 5,879,956 A | | 3/1999 | Seon et al. | |
| 5,913,117 A | | 6/1999 | Lee | |
| 5,922,183 A | | 7/1999 | Rauh | |
| 5,925,183 A | | 7/1999 | Kato et al. | |
| 5,945,084 A | | 8/1999 | Droege | |
| 5,963,417 A | | 10/1999 | Anderson et al. | |
| 5,984,458 A | | 11/1999 | Murai | |
| 6,005,182 A | | 12/1999 | Imanishi et al. | |
| 6,013,391 A | | 1/2000 | Le et al. | |
| 6,015,522 A | | 1/2000 | Filanovsky et al. | |

(Continued)

*Primary Examiner*—Brian K Talbot
(74) *Attorney, Agent, or Firm*—Fox Rothschild LLP; Peter J. Butch, III

(57) ABSTRACT

An electrochemical cell that receives an inlet stream of air and produces an outlet stream of a high oxygen concentration of gas. The cell is made up of a plurality of layers and preferably a porous electrolyte comprised of yttria stabilized zirconia (YSZ) that allows only oxygen ions to pass therethrough and which is covered on its sides with electrodes comprised of lanthanum strontium manganate (LSM) which in turn are coated with a layer of platinum to aid in the even distribution of the electrical current. An electrical current is passed through the electrodes to produce a voltage difference therebetween. The layers of YSZ and LSM are formed by a sol-gel process.

5 Claims, 2 Drawing Sheets

U.S. PATENT DOCUMENTS

| | | |
|---|---|---|
| 6,015,917 A | 1/2000 | Bhandari et al. |
| 6,019,803 A | 2/2000 | Oskam et al. |
| 6,022,748 A | 2/2000 | Charych et al. |
| 6,025,205 A | 2/2000 | Park et al. |
| 6,054,331 A | 4/2000 | Woo et al. |
| 6,074,791 A | 6/2000 | Jennings et al. |
| 6,075,203 A | 6/2000 | Wang et al. |
| 6,077,344 A * | 6/2000 | Shoup et al. .................... 117/9 |
| 6,638,654 B2 * | 10/2003 | Jankowksi et al. ............ 429/26 |
| 2006/0177706 A1 * | 8/2006 | Barnett et al. ................. 429/12 |

* cited by examiner

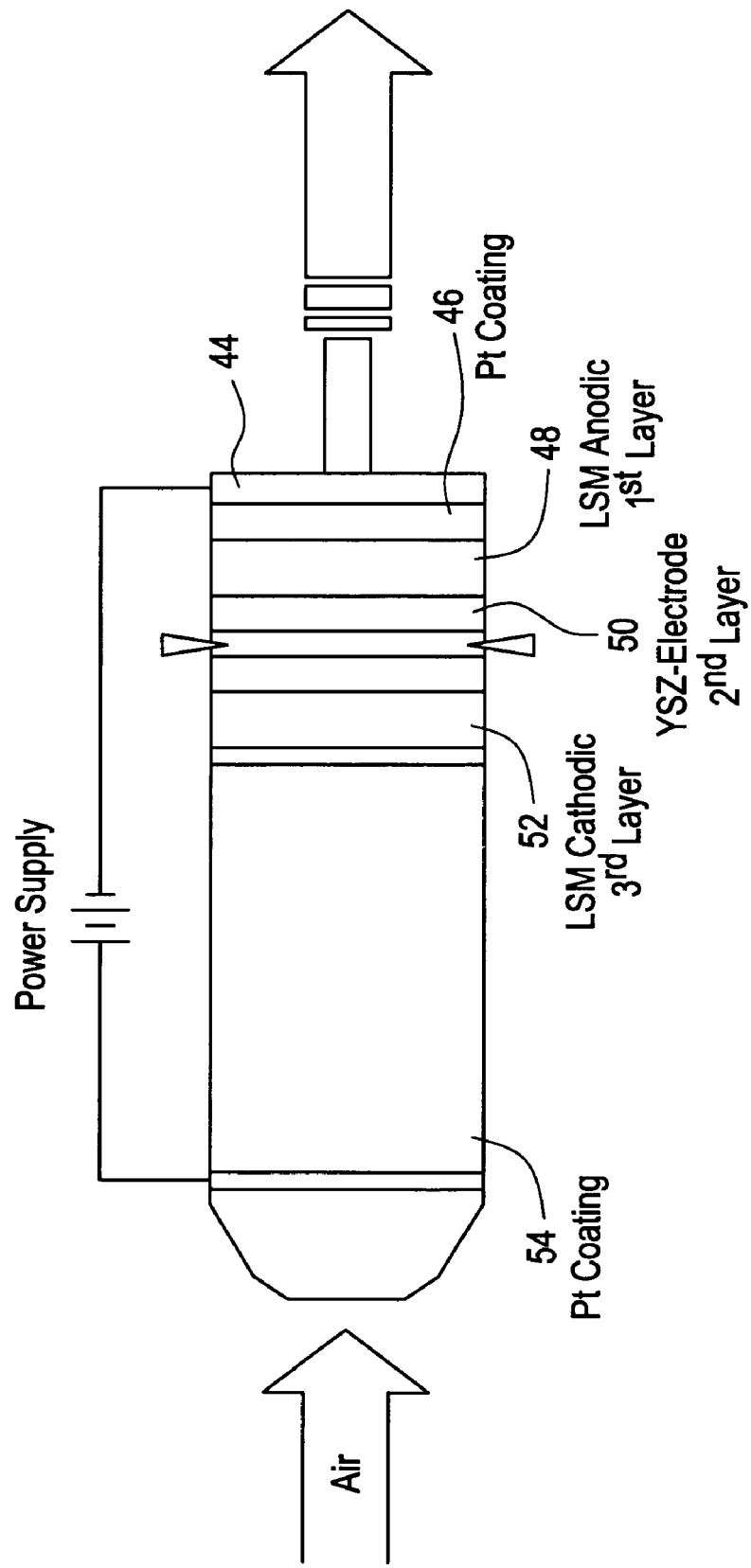

SOL-GEL FABRICATION OF THIN-FILM ELECTROLYTE IN AN OXYGEN GENERATOR

RELATED CASES

The present application is a Divisional of U.S. patent application Ser. No. 10/345,876 filed on Jan. 16, 2003, now abandoned, which in turn was a Continuation of U.S. patent application Ser. No. 09/766,310 filed on Jan. 19, 2001, now abandoned, which claimed priority from U.S. Provisional Application Ser. No. 60/205,458 filed on May 19, 2000. Applicants claim priority under 35 U.S.C. §119(e) as to the said Provisional Patent Application and claim priority under 35 U.S.C. §120 as to the said U.S. Continuation application, and the entire disclosure of all said applications is incorporated herein by reference in their entirety.

BACKGROUND OF THE INVENTION

The present invention relates to an oxygen generator, and more particularly, to an oxygen generator and a method of constructing an oxygen generator capable of producing a yield of a high concentration of oxygen.

There are, of course, many differing methods and apparatus used for the production of a high concentration stream of oxygen, among those presently available include various cryogenic cycles, non-cryogenic air separation plants, including the use of molecular sieves, as well as a number of other methods of producing or extracting oxygen.

One of such methods is through the use of an electrochemical process where an oxygen containing gas, such as air, is caused to pass through a ceramic membrane with an electrical potential applied across the membrane. The oxygen molecules are initially reduced to oxygen ions at the interface between the cathode and the ceramic material and the oxygen ions can selectively pass through the ceramic electrolyte.

After passing through the electrolyte, a further reaction takes place at the interface between the electrolyte and the anode where the oxygen ions are oxidized to reform to oxygen molecules. By the use of a particular ceramic membrane, only the oxygen ions are allowed to pass through the cell and thus the overall process is very selective to the production of a high concentration of oxygen containing gas.

Thus, by a series of reactions, the electrochemical oxygen generator can produce a stream of gas having an enhanced concentration of oxygen. Although the overall process is well known, present oxygen generators have heretofore failed to realize a high concentration of oxygen from the input gas, i.e. currently in the range of about up to 95% concentration. Thus, it would be advantageous to be able to achieve a high concentration of the oxygen in the output from the oxygen concentrator by a refinement of the electrodes, particularly in the materials and the means of applying the material or materials in constructing the electrodes and in applying a uniform application of the electrical potential to the electrodes.

SUMMARY OF THE INVENTION

Thus, in accordance with the present invention, there is produced an oxygen generator that is capable of yielding a considerably higher concentration of oxygen. In accordance with the present invention, the electrodes are comprised of lanthanum strontium manganate, $(La_{1-x}Sr_xMnO_3)$ or LSM and which material is sufficiently porous so as to allow the gas to diffuse therethrough but also has sufficiently high density to provide good conductivity through the material. The selection of the particular material is a compromise between the need for the porosity and the need for a relatively high density required for good conductivity.

The solid electrolyte used in accordance with the invention is a good conductor of oxygen ions and the conductivity is high at high temperatures but is non permeable so as to prevent air from diffusing through the electrolyte and the cell itself. Thus, the material of the present invention is a fluorite type structure oxide $ZrO_2$ that exhibits a conductivity of 1 $Scm^{-1}$ at high temperatures, that is, of about 800 C. The preferred material is yttria stabilized zirconia or YSZ.

Also in the present invention, the sol-gel process is utilized to produce the coating of the lanthanum strontium manganate electrode on to a ceramic substrate, the YSZ on to the LSM electrode and also a coating of LSM onto the YSZ electrolyte. The LSM material has a reasonable electrical conductivity and a high catalytic activity for oxygen reduction and oxidation.

As a further feature of the present invention, a porous platinum coating is used to better distribute the current to the anode and the cathode uniformly and that platinum coating is specially carried out to achieve the results of the present invention. A porous platinum layer is added to a substrate before the anodic layer (bottom layer) and another porous platinum layer over the cathodic layer (top layer). The platinum coatings must be very conductive and very resistant to oxidation, but they also must be porous to allow the gas to pass through. The voltage drop due to the current distributor in any electrochemical device should be very minimal for current distribution, current and voltage efficiency. With the high platinum conductivity of the platinum layer of the present invention, the voltage drop due to the platinum current distributor can be as low as 10 mV for a 1 inch long five layer test section (32 $cm^2$ area). The platinum layer is permeable to gas, compatible to LSM and alumina substrate, adheres well and provides acceptable conductivity.

In summary, therefore, in the construction of the present electrochemical cell used for the production of a gas having a high oxygen concentration, there is initially a substrate that may be a ceramic material having medium porosity. Upon that substrate is applied a platinum layer that aids in achieving an even distribution of the current to be applied to the anode that is, in turn, applied over the aforementioned platinum layer. The anode electrode is comprised of a LSM. Next, there is a coating of the solid electrolyte comprised of YSZ applied to the anode material and which allows only oxygen ions through the electrolyte. Atop of the solid electrolyte, there is another electrode, this time the cathode, and which, again, is a coating of LSM. Finally, a further coating of platinum is applied to the cathode material to achieve an even, good distribution of current through the cathode. Accordingly the overall electrochemical cell of the preferred embodiment is comprised of five layers of differing, optimized materials to produce a stream of gas having a high concentration of oxygen upon air passing into the cell and upon the application of a electrical current across the electrodes Other features of the present electrochemical cell and the process for making the same will become apparent in light of the following detailed description of a preferred embodiment thereof and as illustrated in the accompanying drawings.

BRIEF DESCRIPTION OF THE DRAWINGS

FIG. 3 is a further schematic view of a prototype oxygen generator constructed in accordance with the present invention.

DETAILED DESCRIPTION OF THE INVENTION

Figure 1:
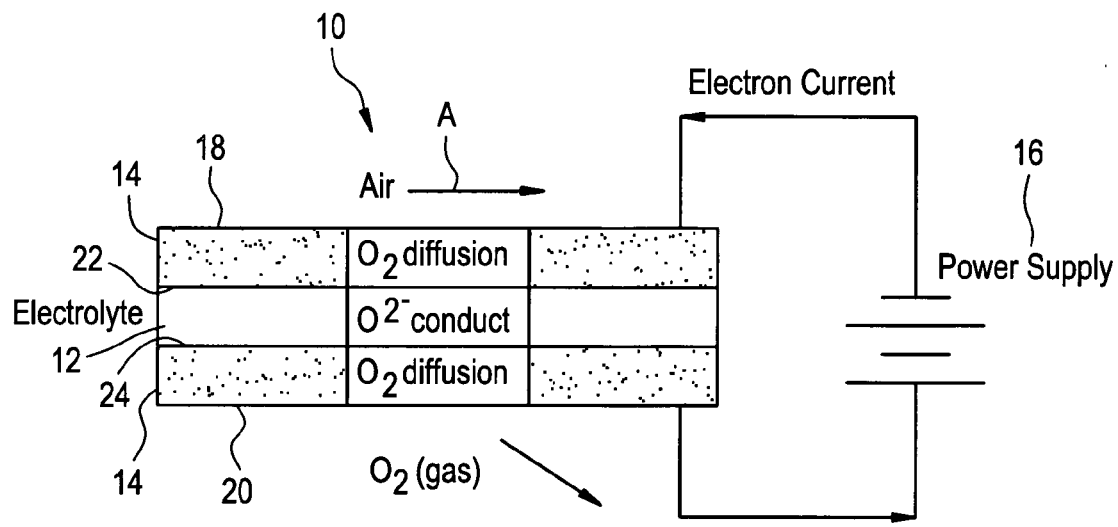
FIG. 1 is a schematic view showing the overall process of the present invention of the electrochemical cell used to produce a high concentration of oxygen.

Turning first to FIG. 1, there is shown a schematic view of an oxygen generator cell 10 that is used to carry out the electrochemical reaction to obtain a high concentration oxygen stream from passing air through the cell 10. The schematic is used as illustrative of the overall electrochemical process used in carrying out the present invention and which has contributed an improvement to achieve a considerably higher concentration of oxygen in the outlet gas.

As seen in FIG. 1, a membrane or electrolyte 12 is provided and which contains oxygen vacancies in the crystal lattice such that the electrolyte 12 can conduct oxygen ions therethrough but is resistant to the passage of other ions. A pair of electrodes 14 are in electrical contact with the electrolyte 12 and are spaced apart and an electrical current is caused to flow between those electrodes 14 by means of a power supply 16 so as to create a voltage between those electrodes 14 and thus across the electrolyte 12. As conventionally used herein, the electrodes 14 will be referred to as the cathode electrode 18 and the anode electrode 20 to differentiate between the electrodes 14.

In carrying out the process, the overall cell 10 is operated at an elevated temperature, typically about 800 degrees C. and air is caused to pass over the cathode electrode 18 a shown by the arrows A in the Figure. The air diffuses through the cathode electrode 18 that is a porous electrode and the air advances to the cathode/solid electrolyte interface 22. At the cathode/solid electrolyte interface 22 there is a reaction that takes place to reduce the oxygen molecule to oxygen ions in accordance with the following equation:

$$O_2 \text{ (gas 0.2 atm)} + 4e^- \longrightarrow 2O^{2-} \text{ (electrolyte)}$$

Thus, the oxygen ions that are formed from the foregoing reaction diffuse through the solid electrolyte 12 since that electrolyte material can accept only oxygen ions and allow those ions to pass through the solid electrolyte 12. The other gases present in the feed are not transported through the solid electrolyte 12. The movement of the oxygen ions through the electrolyte 12 is caused by the application of the electrical potential across the electrolyte 12 and that passage of oxygen ions is further enhanced by the presence of the elevated temperature.

Accordingly the oxygen ions progress through the electrolyte 12 influenced by the electrical field and reach the anode/electrolyte interface 24 where another reaction takes place that oxidized the oxygen ions into oxygen molecules in accordance with the following equation:

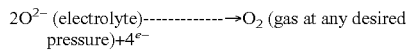
$$2O^{2-} \text{ (electrolyte)} \longrightarrow O_2 \text{ (gas at any desired pressure)} + 4e^-$$

Thus, the oxygen molecules formed by the reaction that takes place at the anode/electrolyte interface 24 then can simply pass through the anode electrode 20 that is, like the cathode electrode 18, porous so that the output gas can be collected and is of a high concentration of oxygen.

Accordingly, in accordance with the basic foregoing mechanism, a high concentration oxygen stream can be produced at the output of the electrochemical cell 10. As can now be well understood, the materials used in the electrochemical cell 10 must be carefully selected in order to approach high oxygen concentrations desired in the output stream from the electrochemical cell 10. The electrodes must, of course, be able to function at the elevated temperatures of the electrochemical cell 10 and be chemically and thermally stable at those temperatures but also must exhibit high electrical conductivity and good catalytic activity.

The material chosen for the electrodes ultimately ends in a compromise between a porous layer, which would allow the gas to diffuse through the cathode layer but with a density high enough to provide a good conductivity through the material. Other factors, as explained, relate to the thermal expansion of the electrode material as well as the catalytic activity for the reduction of oxygen.

In carrying out the present invention, therefore, all of the foregoing factors are taken under consideration in arriving at the composition of the electrodes and the method by which those electrodes are applied to the surface of the solid electrolyte as will later be explained.

Also, the same considerations of the selection of the material are required in the solid electrolyte, that is, the material must, obviously, be a selective conductor of oxygen ions i.e. not diffuse air, and the conductivity high at the elevated temperatures at which the present electrochemical cell 10 is operated. The material of the electrolyte also must be compatible with the material of the electrodes and should be thin, and defect free to enhance the uniform progress of the oxygen ions through that electrolyte material.

Figure 2:
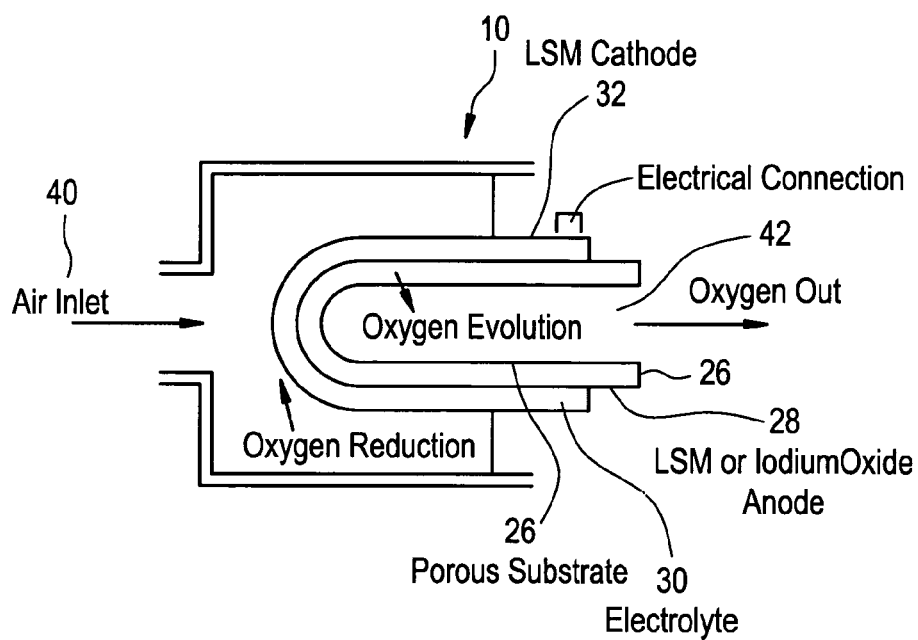
FIG. 2 is a schematic view of a specific oxygen generator constructed in accordance with the present invention.

Turning now to FIG. 2, there is shown a schematic view of an electrochemical cell 10 constructed in accordance with the present invention showing the various layers of particular selected materials. In FIG. 2, there can be seen a porous substrate 26 that is comprised of a ceramic filter thimble of medium porosity and readily commercially available from the Fisher Scientific International, Inc., headquartered at Hampton, N.H. That substrate 26 forms the basic structure for the overall electrochemical cell 10. Upon that substrate 26, there is applied a thin layer of a material to make up the anode electrode 28. That material is lanthanum strontium manganate and is applied by the sol-gel process.

A thin layer of a solid electrolyte 30 covers the anode electrode 28 and the solid electrolyte 12 is preferably yttria stabilized zirconia. Atop of the solid electrolyte 30, there is a further cathode electrode 32, again comprised of lanthanum strontium manganate. Each of the respective layers is deposited so as to have a thickness of about 20 microns.

An air inlet 40 allows the air to be introduced to the electrochemical cell 10 in order to carry out the process and an outlet 42 channels the oxygen enriched gas stream from the electrochemical cell 10 after having passed therethrough.

Turning now to FIG. 3, there is shown a schematic view of a further refined electrochemical cell 10 constructed in accordance with the present invention. With the design of the FIG. 3 embodiment, the number of layers in the electrochemical cell 10 has been increased to five (5). As shown, there is a porous substrate 44 that is an extraction thimble with medium porosity and dimensionally about 45 mm dia.×120 mm long. The porous substrate forms the basic structure for the overall electrochemical cell 10. Again, the preferred substrate is available commercial from the Fisher Scientific International, Inc. A porous platinum layer 46 is added to the porous substrate 44 followed by an anodic layer (bottom layer) 48 of lanthanum strontium manganate.

Next, the electrolyte layer 50 of yttria stabilized zirconia is applied and thereafter the cathodic layer 52 of lanthanum strontium manganate followed by another porous platinum layer 54 over the cathodic layer 52. The platinum layer 54 is different from the porous platinum layer 46. The platinum layer 54 is applied as one thin layer and heat treated at 900n degrees C. for about 5 minutes. This platinum paste is supplied by Ferro Corporation. The porous platinum layers 46 and 54 must be conductive and very resistant to oxidation, but they also must be porous to allow the gas to pass through. With high platinum conductivity, the voltage drop due to the platinum current distributor can be as low as 10 mV for a 1 inch long five layer test section (32 cm$^2$ area). Then platinum layer is permeable to gas, as well as being compatible to LSM and alumina substrate. The platinum layers adhere well and provide acceptable conductivity.

Taking, therefore, the individual layers in the afore-described sequence. The platinum layer 46 is initial applied to the porous substrate 44. In forming the platinum layer 46, the basic preferred material used is a platinum conductor paste available commercially as #LP11-4493 from Heraeus Incorporated, Cermalloy Division, West Conshohocken, Pa. 19428. That paste is applied onto the porous alumina substrate 44 by means of an artist's brush. For consistency, an entire tube of about 3 grams of paste are mixed with thinner until thin. The thinner is added drop by drop to achieve a relatively thin material that can be applied by a brush to the substrate 44. The thinner is preferably also a product that is readily available from Heraeus Incorporated as product #RV-372. The platinum paste that has been thinned into a flowable material is applied by the brush with an up and down stroke and the entire 3 grams applied in layers. About 1 gram of the platinum material is brushed onto the substrate 44 for each layer. The three grams are used for the entire area of about 100 square cm.

After one layer of the platinum material is applied, it is heater to 150 degrees C. for about 10 to 15 minutes and the procedure repeated until the aforementioned amount of platinum has been applied to the substrate. For the final coating of the platinum, the coating is heated to 150 degrees C. for 10 to 15 minutes and then fired at about 900 degrees C. for about 10 minutes.

Next, the anodic layer 48 of LSM is applied to the layer of platinum just described. As will be seen, the anodic layer 48 and the cathodic layer 52 are basically carried out and applied by means of the same process and thus, in describing the application of the anodic layer 48 of the LSM to the porous platinum layer 48, the same described process will later apply to the application of the coating of the cathodic layer 52 that is applied to the electrolyte layer 50.

As referenced, the various layers of the anodic layer 48 and the cathodic layer 52, as well as the solid electrolyte layer 50 are formed by means of a sol-gel process that is controlled so as to produce the desired composition of those layers as well as the desired thickness of the layers themselves and that process is basically a chemical synthesis of the oxides from soluble precursors. With a sol-gel process, organic and inorganic salts of the metal species are mixed to produce the overall stoichiometry indicated for the intended ultimate composition of the layer of material. The gel is prepared by mixing the following three component in separate beakers over a stirrer set to a medium stir rate.

a) 3.2570 g of Sr(NO$_3$)$_2$ (Strontium Nitrate) with 16.7 ml of distilled water until fully dissolved.

b) 8.6470 g of Mn(CH$_3$OO)$_2$*4H$_2$O (Manganese Acetate) with 50 ml of distilled water until fully dissolved.

c) 12.378 g of LaCl$_3$*7H$_2$O (Lanthanum Chloride) with 33.3 ml of distilled water until fully dissolved.

The contents of part c) and part a) are mixed together and thereafter the contents of part b) are mixed in for a period of about 5 minutes. About 10 grams of citric acid are added to the mixture and the solution can be seen to thicken and become white. Immediately thereafter, 10 ml of ethylene glycol are added and which causes the solution to become slightly thinner. Soon thereafter, 10 drops of 0.1 M of NH$_4$OH are added and the mixture is allowed to stir for about 30 minutes. After that stir period, the LSM gel is ready to be applied to the layer of platinum previously described.

Thus, the electrodes are comprised of lanthanum strontium manganate that is coated by the use of the sol-gel process as will be described as well as is the solid electrolyte material that is a fluorite type of structure oxide ZrO$_2$. Accordingly, the salts of the aforementioned materials are dissolved in a liquid medium, preferably water, so that the thin layers of those materials can be used to build up to the desired thickness. The liquids increase in viscosity upon the application to a substrate and form a solid gel. The thus formed gel requires heat treatment to develop the proper crystal phases.

With respect to the coating of the anodic layer 48, twenty (20) coatings are preferably applied with each coat heat treated at 1100 deg. C., for 6 minutes. After each five layers, the layers are treated to 1100 deg. C. for 10 minutes and a final heat treatment is provided to the complete layered coating at 1200 degrees C. for half an hour. The preferred conditions for the cathodic layer 52 are the ten (10) coatings, each applied with a heat treatment at 600 deg. C. for 15 minutes for each coating and at 1000 deg. C. for half an hour every five coatings. The top cathodic LSM layer 52 is not an important issue since it just needs to insure a 3-point junction with the YSZ and the air.

Next, as to the coatings to form the solid electrolyte layer 50 of YSZ, again the sol-gel process that is used and that process involving zirconia begins with a zirconium oxylchloride solution. That solution is readily available from the Magnesium Electron Corporation of NJ. The solutions are reacted with ammonia and water to create the fine distribution of zirconia particles that deposit on the electrodes. The viscosity of the as prepared gel is quite stable around 100 cps. The adhesion on the LSM is quite good.

The YSZ gel is prepared as follows:

60 ml of distilled water is warmed in a beaker over a hotplate with a stirrer. The heat is a low setting and the stirrer is on a medium setting. 60 ml of ethanol is added to the water and thereafter 20 ml of Zirconium oxylchloride (ready-made solution purchased from Magnesium Electron Corporation). Thereafter 1.24 g of Y(NO$_3$)$_3$*6H$_2$O is added to the mixture. When the mixture is warm, 60 ml of 1.5 M NH$_4$OH is added in 1 ml amounts. White agglomerates may form and are allowed to dissolve before adding more base. When the base is added too quickly, the gel will thicken too much. The mixture is stirred over heat for about 30 minutes. At that point, the mixture will appear cloudy. The mixture is allowed to cool and is, at that point, ready to apply to the substrate.

The crystalline oxide is obtained after a thermal treatment up to 1000 deg. C. Several structures are possible for ZrO$_2$. Cubic ZrO$_2$ is a high temperature phase and is the best for ionic activity, however, unfortunately it could not be achieved even through fast cooling. Therefore, to solve that problem, the yttria was added during the preparation of the cell using Y(NO$_3$)$_3$ in a molar ratio of 10%. The presence of yttria in the oxide network helps the stabilization of the cubic phase.

Again, in the application of the YSZ, the thus formed solution is applied onto the anodic layer 48 of the LSM with an artists brush in upward strokes while leaving a section of the bottom layer of the platinum layer 46 exposed for the later connection to the source of electrical current. Each YSZ layer consists of three coats of the material, therefore, there are three coats of the material applied at a time to form one layer, at which time the heat treatment is applied to each layer. For example for one layer, three coats of YSZ are brushed on to the anodic layer 48, then the layer is heated to 1100 degrees C. for 6 minutes. The process is repeated for each layer and after every $5^{th}$ layer, the layers are heated to about 1100 degrees C. for 12 minutes. After the last layer, there is a further three coats of YSZ that are applied and the overall layers are heated to 1200 degrees C. for 60 minutes.

With the use of the sol-gel process, however, the coatings thus formed exhibit excellent homogeneity, high adherence and good mechanical and thermal compatibility and are thus well suited for the present use in the fabrication of an oxygen generator. In addition, the sol-gel process is capable of producing an oxygen electrochemical cell inexpensively as well as to form a molecular bond that exhibits excellent strength and no leakage. With the use of thin layers, the electrical impedance is low and thus results in an improvement on the overall cell performance.

While the present invention has been set forth in terms of a specific embodiment, it will be understood that the present electrochemical cell herein disclosed and the process for making the cell may be modified or altered by those skilled in the art to other devices and methods. Accordingly, the invention is to be broadly construed and limited only by the scope and spirit of the claims appended hereto.

We claim:

1. A method of fabricating an electrochemical oxygen generator comprising the steps of:
   a) providing a porous gas permeable cylindrical tube comprising an open end, a closed end, an interior surface and an exterior surface,
   b) coating said exterior surface with a first gas permeable conductive metal electrode layer,
   c) coating said first conductive metal electrode layer with a gas permeable lanthanum strontium manganate anode layer by means of a sol-gel process comprising applying layers of a gel solution formed from aqueous solutions of water-soluble strontium, manganese and lanthanum salts and heating each layer after it is applied to a temperature between about 1000 and about 1200° C.,
   d) coating a solid gas impermeable electrolyte gel layer comprising yttria stabilized cubic zirconia onto the anode layer by means of a sol gel process comprising applying layers of a gel solution formed from aqueous solutions of water-soluble yttrium and zirconium salts, heating each layer after it is applied to a temperature and for a duration of time effective to form cubic phase $ZrO_2$, and heating the overall layers to 1200° C. for 60 minutes, wherein said yttrium salt is present in an amount effective to stabilize said cubic phase in said solid electrolyte layer,
   e) coating a gas permeable of lanthanum strontium manganate cathode layer onto the solid electrolyte layer by means of a sol-gel process comprising applying layers of a gel solution formed from aqueous solutions of water-soluble strontium, manganese and lanthanum salts and heating each layer after it is applied to a temperature between about 600 and about 1000° C., and
   f) coating a second gas permeable conductive metal electrode layer onto said cathode layer.

2. A method of fabricating an electrochemical oxygen generator as defined in claim 1 wherein said gel solution is formed by mixing aqueous solutions of zirconia oxychloride and a water-soluble yttrium salt.

3. A method of fabricating an electrochemical oxygen generator as defined in claim 2 wherein the water-soluble yttrium salt is $Y(NO_3)_3$.

4. A method of fabricating an electrochemical oxygen generator as defined in claim 1 wherein said steps b) and f) for coating a conductive metal electrode layer comprise coating a plurality of coats of thinned platinum paste.

5. A method of fabricating an electrochemical oxygen generator as defined in claim 1 wherein said step of applying layers of a gel solution formed from aqueous solutions of water-soluble yttrium and zirconium salts comprises heating the layers to about 1100 degrees C. after every fifth layer is applied.

* * * * *